United States Patent
Günther

(10) Patent No.: US 6,983,422 B1
(45) Date of Patent: Jan. 3, 2006

(54) PAGE WINDOWS COMPUTER-CONTROLLED PROCESS AND METHOD FOR CREATING PAGE WINDOWS

(75) Inventor: Erich Günther, Herzogenaurach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/520,890

(22) Filed: Mar. 7, 2000

(51) Int. Cl.
G06F 3/00 (2006.01)
G09G 5/02 (2006.01)
G05B 19/42 (2006.01)

(52) U.S. Cl. ............... 715/768; 715/790; 715/788; 715/803; 715/967

(58) Field of Classification Search ............... 700/83, 700/86, 84, 266, 87; 345/839, 629, 630, 345/631, 770, 965, 970, 967, 592; 364/190, 364/200, 188; 715/790, 788, 768, 502, 803, 715/967

See application file for complete search history.

(56) References Cited

U.S. PATENT DOCUMENTS

| | | | |
|---|---|---|---|
| 4,942,514 A * | 7/1990 | Miyagaki et al. | 700/85 |
| 5,507,164 A | 4/1996 | Trausi et al. | |
| 6,256,625 B1 * | 7/2001 | Breyer et al. | 707/3 |
| 6,396,473 B1 * | 5/2002 | Callahan et al. | 345/530 |
| 6,480,201 B1 * | 11/2002 | Fushiki et al. | 345/592 |
| 6,731,302 B1 * | 5/2004 | Cote | 345/619 |

FOREIGN PATENT DOCUMENTS

| | | |
|---|---|---|
| EP | 0 389 132 A2 | 9/1990 |
| EP | 0 537 564 A1 | 4/1993 |
| EP | 0 539 822 A2 | 5/1993 |
| EP | 0 578 831 A1 | 1/1994 |
| WO | WO 91/06050 | 5/1991 |

* cited by examiner

Primary Examiner—Ba Huynh
Assistant Examiner—Nhon (Gary D.) Nguyen
(74) Attorney, Agent, or Firm—Sughrue Mion, PLLC

(57) ABSTRACT

Computer controlled processes rely upon graphical user interfaces to effect the man-machine interface. The page windows of the present invention are comprised of a base image screen that includes regions responsive to control and status stimuli, as well as static graphic representations. The base image screen is merged with a secondary image, which includes regions responsive to control and status stimuli, as well as static graphic representations. The process of merging the secondary image includes preventing the display of certain control and status regions on the base image, as dictated by the secondary image. Multiple secondary screens can be merged on the base image screen, thereby allowing multiple page windows to be created using only a base image and a plurality of secondary screens.

28 Claims, 13 Drawing Sheets

PAGE WINDOWS COMPUTER-CONTROLLED PROCESS AND METHOD FOR CREATING PAGE WINDOWS

BACKGROUND OF THE INVENTION

1. Technical Field of the Invention

This invention is related to computer page windows with control, static and status display elements that convey information to the computer user. Specifically, the invention is a method for displaying a base image and merging the base image with at least one secondary image, thereby creating a page window. Thus, the computer presents a page window to the user that is composed of both the base and secondary images. The base and secondary images incorporate graphical representations indicative of control, static and status elements. The invention is embodied in various structures and methods, a computer system with software instructions adapted to perform the methods, and a computer program product bearing software instructions adapted to perform the methods.

2. Description of the Related Art

Graphical user interfaces have become an indispensable part of the man-machine interface for computer equipment. A graphical user interface allows a user to easily manipulate a myriad of control points, as well as to monitor the status of the computer-controlled process. For example, a numerically-controlled machine tool includes a computer incorporating a graphical user interface comprising several different page windows, wherein each page window controls a separate function of the machine tool. Each page window includes control elements for managing the machine tool's functions, as well as status elements for depicting the progress of the machine tool's current operation. A second example is a computer system that controls chemical processing equipment. The computer system displays a layout of the chemical process, with its attendant control valves and pressure gauges that instrument various points of the process. Typically, each page window presented by the computer would contain the piping of the chemical process, along with the location of the valves and other process controls. More likely, the computer is connected to a network of user interfaces located at various control locations dispersed within the chemical plant, wherein the individual user interfaces allow the workers to view control and status page windows as necessary.

Thus, in the context of projecting operator control and monitoring apparatus, a frequently imposed requirement is that specific page windows include functions that are to be made available in all of the page windows. To date, this problem has been solved using two different methods. The first method involves dividing the page window into two regions, the permanent window and the main window. A permanent picture embodies fields, controls and/or other display elements. The permanent picture is rendered in the permanent window, and the permanent window is present in all the page windows presented by the computer, regardless if the fields, controls and/or other display elements shown in the permanent picture are relevant to the current portion of the process being controlled or monitored. In addition, main pictures embodies fields, controls and/or other display elements. Each page window has a unique main picture, and, unlike the permanent picture, a main picture will only contain fields, controls and/or other display elements that are specific to the portion of the process that is being controlled or monitored. As the computer-controlled process progresses, the appropriate main picture is rendered in the main window.

The second method involves the use of function keys. If function keys are present on the apparatus, it is possible to project a global allocation with functions. If nothing else was projected for a function key in an image, this global allocation was used. Thus, the globally projected function is available in all the images, whether or not the globally projected function is actually used. If nothing else was projected for a key in an image, the global allocation was used. The problem, of course, arises when page windows are displayed with function keys that do not relate to any function currently being displayed or controlled by the page window presently being displayed by the computer.

Referring to FIG. 1A, a page window depicting a process flow along a pipe is illustrated. The flow direction element 1 is a static element that depicts the direction of the process flow for the user. The pipe 9 is comprised of static elements that allow the user to visually understand how the valves 4–8 are interconnected together. The gauges 2–3 are status elements that indicate the current pressure in the pipe 9. The valves 4–8 positioned along the pipe 9 are status elements that depict the regulation of fluid flow along the pipe 9. These elements are part of a main picture rendered in the main window 16. Buttons 10–14 are control elements that open and close the valves 4–8 along the pipe 9. The buttons 10–14 are part of a permanent picture rendered in the permanent window 15. The buttons 10–14 may also be linked via software to function keys on the apparatus, e.g., function keys FN1–FN5 activate the buttons 10–14. The button 10 entitled VALVE 1 controls the valve referenced by the reference numeral 4, and the button 11 entitled VALVE 2 controls the valve referenced by the reference numeral 5. The buttons 12–14 entitled VALVE 3, VALVE 4 and VALVE 5 control the valves referenced by reference numerals 6, 7 and 8, respectively.

Referring to FIG. 1B, the page window illustrated is similar to FIG. 1A, although certain elements present in FIG. 1A are absent. Some of the valves 5,7,8, as well as one of the pressure gauges 2, are not present on the main picture rendered in the main window 16. Although all the buttons 10–14 are displayed on the permanent picture rendered in the permanent window 15, only the buttons VALVE 1 and VALVE 3 would have any effect, since there are no valves for the buttons entitled VALVE 2, VALVE 4 and VALVE 5 to control. Under the prior art method, these buttons would still be globally allocated to certain valves, thus leading to potential control problems. This illustrates the limitation of the prior art, in that fields, although not used by the current page window, are still presented. In addition, the page window illustrated in FIG. 1B is different from the page window illustrated in FIG. 1A. Thus, the computer programmer has to create two entirely different main pictures, which can lead to configuration problems if many different iterations of the same basic control program are required to meet customer desires.

A product called VISU from the company called RESO-TEC implemented page windows in a similar fashion as described above. This product debuted in Hannover, Germany in 1998. VISU does not, however, provide for the modification of the permanent picture in the permanent window by a main picture presented in the main window.

SUMMARY OF THE INVENTION

The invention has been made in view of the above circumstances and has an object to overcome the above problems and limitations of the prior art. A further object is providing capability for a method of displaying a base image that is modified by at least one secondary image.

Additional objects and advantages of the invention will be set forth in part in the description that follows and in part will be obvious from the description, or may be learned by practice of the invention. The objects and advantages of the invention may be realized and attained by means of the instrumentalities and combinations particularly pointed out in the appended claims.

It is a further object of the invention to provide a method, a computer system and a computer program product for displaying page windows for a computer controlled process wherein the page windows include a base image and a plurality of secondary images merged with the base image.

It is a further object of the invention to provide a method, a computer system and a computer program product for displaying page windows for a computer controlled process, wherein the page windows include a base image and a plurality of secondary images merged together such that the secondary image modifies the elements incorporated in the base image.

It is a further object of the invention to provide a method, a computer system and a computer program product for displaying page windows for a computer controlled process, wherein the page windows include a base image that has been derived from a plurality of base images such that during the merger of the base images to derived the final base image, pre-selected elements of the base image are suppressed by another base image.

It is a further object of the invention to provide a method, a computer system and a computer program product for displaying page windows for a computer controlled process, wherein the page windows include a base image that incorporates control and status regions responsive to stimuli, and a plurality of secondary images that incorporate control and status regions that are responsive to stimuli.

According to the invention, the base image includes at least control elements, status elements, and/or static elements.

According to the invention, the secondary image includes at least control elements, status elements, and/or static elements.

According to the invention, the secondary image modifies the base image during merger, wherein pre-selected elements of the base image are suppressed by the secondary image when the base and secondary images are merged.

According to the invention, one base image can modify another base image during merger of base images to derive a final base image, wherein pre-selected elements of one base image are suppressed by another base image when the two base images are merged.

According to the invention, the page window for a computer display screen can be created by the operational software of the computer system at run-time, or created prior to use in the computer system and downloaded to the computer system.

According to the invention, the base image for a page window for a computer display screen, wherein the base image is derived from a plurality of base images, can be created by the operational software of the computer system at run-time, or created prior to use in the computer system and downloaded to the computer system.

Preferably, the invention provides page windows for a computer display screen, and the page windows include a base image that includes at least one base display element for display on the computer display screen, and at least one secondary image that includes at least one secondary display element for display on the computer display screen in conjunction with the base image.

Preferably, the invention provides a plurality of page windows for a computer controlled process, and each page window includes a base image, including at least one base image element, that forms the background for the plurality of page windows presented by the computer controlled process, wherein the base image element is at least one of a control element, a static element and a status element; and a plurality of secondary images, each secondary image including at least one secondary image element, wherein the secondary image element is at least one of a control element, a static element and a status element, wherein each of the plurality of page windows presented by the computer controlled process is formed by the merger of at least one of the plurality of secondary images with the base image.

Preferably, the invention provides a page window for a computer controlled process, and the page window includes a base image including at least one base image element responsive to either control or status stimuli; and a plurality of secondary images, each including at least one secondary image element responsive to either control or status stimuli, wherein the page window is formed by merger of the base image and one of the plurality of secondary images.

Preferably, the invention provides a method for displaying page windows for a computer controlled process on a computer display screen, wherein the method includes retrieving a base image composed of at least one base image element from memory; retrieving a secondary image composed of at least one secondary image element from memory; merging the retrieved base image with the retrieved secondary image; and displaying the merged base image and secondary image as a single page window on a computer display screen.

Preferably, the invention provides a computer system adapted to displaying page windows for a computer-controlled process on a computer display screen. The computer system includes a processor, and a memory including software instructions adapted to enable the computer system to perform predetermined steps. The predetermined steps include retrieving a base image composed of at least one base image element from memory, retrieving a secondary image composed of at least one secondary image element from memory, merging the retrieved base image with the retrieved secondary image, and displaying the merged base image and secondary image as a single page window on a computer display screen.

Preferably, the invention also provides a computer program product for enabling a computer to display page windows for a computer controlled process on a computer display screen. The computer program product includes software instructions for enabling the computer to perform predetermined operations, and a computer readable medium bearing the software instructions. The predetermined operations include the steps of retrieving a base image composed of at least one base image element from memory, retrieving a secondary image composed of at least one secondary image element from memory, merging the retrieved base image with the retrieved secondary image; and displaying the merged base image and secondary image as a single page window on a computer display screen.

Preferably, the invention also provides a method for presenting a page window for a computer controlled process, and the method includes retrieving a base image including at least one base image element responsive to either control or status stimuli, retrieving a secondary image including at least one secondary image element responsive to either control or status stimuli, merging the base image and secondary image, wherein the secondary image modifies the base image, and displaying the merged base and secondary images as a single page window.

Preferably, the invention provides a computer system adapted to presenting a page window for a computer controlled process, the computer system including a processor and a memory including software instructions adapted to enable the computer system to perform predetermined steps. The predetermined steps include retrieving a base image including at least one base image element responsive to either control or status stimuli, retrieving a secondary image including at least one secondary image element responsive to either control or status stimuli, merging the base image and secondary image, wherein the secondary image modifies the base image, and displaying the merged base and secondary images as a single page window.

Preferably, the invention also provides a computer program product for enabling a computer to present a page window for a computer controlled process, the computer program product including software instructions for enabling the computer to perform predetermined operations, and a computer readable medium bearing the software instructions. The predetermined operations include retrieving a base image including at least one base image element responsive to either control or status stimuli, retrieving a secondary image including at least one secondary image element responsive to either control or status stimuli, merging the base image and secondary image, wherein the secondary image modifies the base image, and displaying the merged base and secondary images as a single page window.

The above and other objects and advantages of the invention will become apparent from the following detailed description and with reference to the accompanying drawing figures.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DESCRIPTION OF THE PREFERRED EMBODIMENTS

Figure 1A:
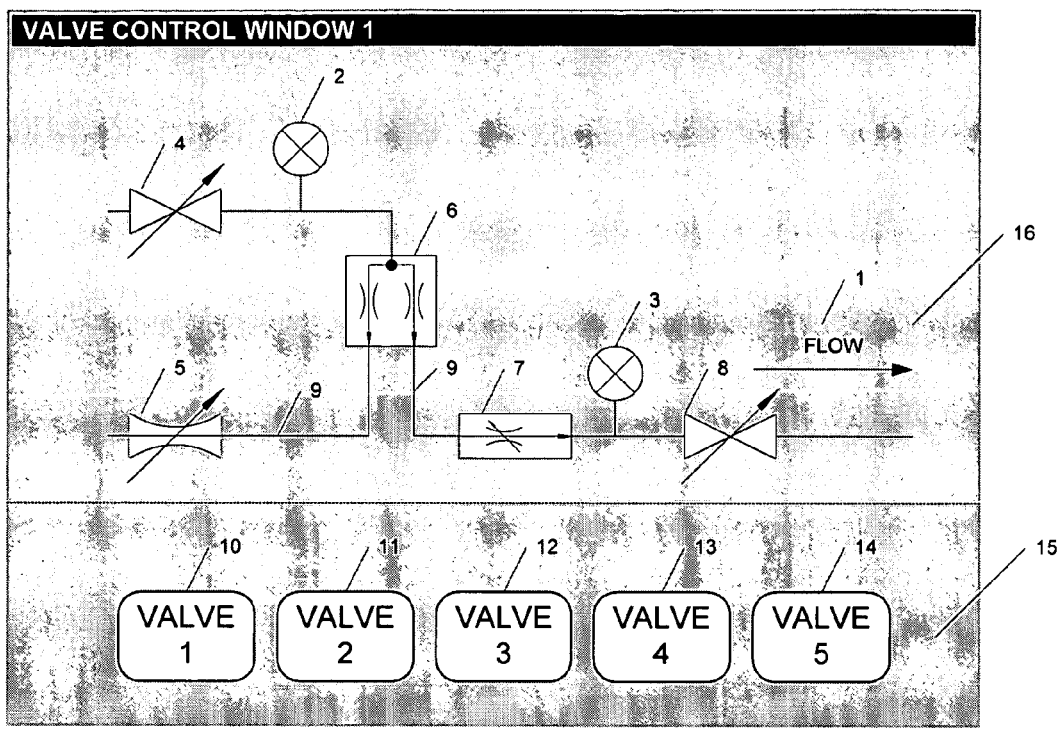
FIGS. 1A–1B are illustrations of a prior art method of presenting control and status elements on a page window.
Figure 1B:
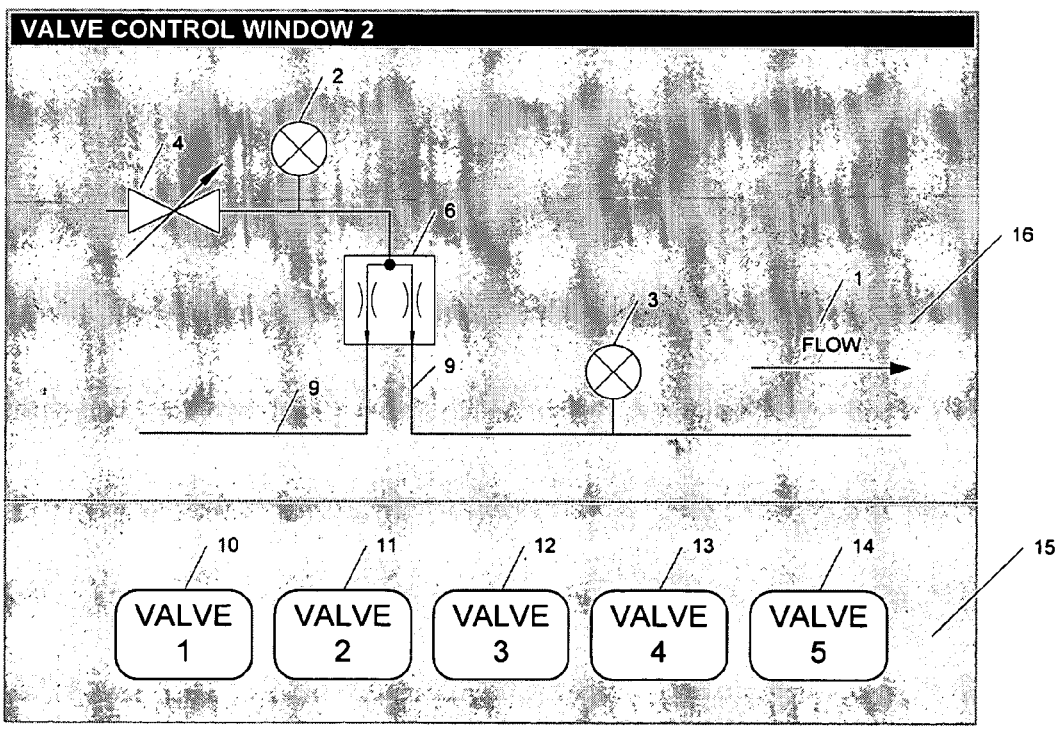

Prior to describing the presently preferred embodiment of the invention, some details concerning the prior art will be provided to facilitate the reader's understanding of the invention and to set forth the meaning of various terms.

As used herein, the term "computer systems" encompasses the widest possible meaning and includes, but is not limited to, stand-alone processors, networked processors, mainframe processors, processors in a client/server relationship, and embedded processors. The term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to distribute a computer program, the supplier might provide a diskette or might transmit the computer program in some form via satellite transmission, via a direct telephone link, or via the Internet.

Although computer program software might be "written on" a diskette, "stored in" an integrated circuit, or "carried over" a communications circuit, it will be appreciated that, for the purposes of this discussion, the computer usable medium will be referred to as "bearing" the computer program software. Thus, the term "bearing" is intended to encompass the above and all equivalent ways in which computer program software is associated with a computer usable medium.

For the sake of simplicity, therefore, the term "program product" is hereafter used to refer to a computer useable medium, as defined above, which bears a computer program in any form.

As used herein, the term "page window" shall mean an image that is rendered in a window on the computer page window. As will be described below, a page window is formed from at least one base image and one or more secondary images merged together, and then presented on the computer display screen.

As used herein, the term "base image" shall mean a computer image that forms the basis for all the images that are projected on a computer screen. As will be described herein, a base image can be comprised of several other base images. The process for deriving such a base image is similar to the merger between a base image and a secondary image, wherein the base image can be modified by the secondary image. When two base images are merged, one base image can add or suppress the base image elements on the other base image. One of skill in the art will appreciate that a myriad of image types and formats can be used as a base image by the present invention.

As used herein, the term "secondary image" shall mean a computer image that forms a page window, in conjunction with base image, that is projected on computer screen. One of skill in the art will appreciate that a myriad of image types and formats can be used as a secondary image by the present invention.

As used herein, the term "control element" shall mean an element that is displayed by a computer on screen of the computer terminal such that a user can control, click on, or otherwise manipulate the element to affect a computer controlled process. A "base control element" is a control element that is associated with the base image, and sirmilarly, a "secondary control element" is a control element that is associated with a secondary image. One of skill in the art will appreciate that the term "control element" as used herein includes icons, bitmaps or other commonly used techniques in a graphical interface environment.

As used herein, the term "status element" shall mean an element that is displayed by computer on screen of a computer terminal such that the element projects information to the user regarding an aspect of an ongoing computer controlled process. A "base status element" is a status element that is associated with the base image, and similarly, a "secondary status element" is a status element that is associated with a secondary image. One skilled in art will appreciate term "status element" as used herein includes icons, bitmaps or other commonly used to interface with the user in a graphical user environment.

As used herein, the term "static element" shall mean an element that is displayed by computer on screen a computer terminal such that the element projects static information to the user regarding an aspect of a computer controlled process. A "base static element" is a static element that is associated with the base image, and similarly, a "secondary static element" is a static element that is associated with a secondary image. One example of the static element may be symbols representing the piping in a computer controlled chemical process. One of skill in the art will appreciate that the term "static element" as used herein includes icons, bitmaps or other commonly used to interface with the user in a graphical user environment.

As used herein, the term "base image element" shall mean any element from the group including base control elements, base static elements and base status elements.

As used herein, the term "secondary image element"-shall mean any element from the group including secondary control elements, secondary static elements and secondary status elements.

A first embodiment of the present invention will now be described. According to one aspect, the present invention is directed to a page window for a computer display screen, which includes a base image that includes at least one base static element for display on the computer page window. As described above, the base static element is a display element that does not control a function, nor is it animated. It merely provides structure to the user so that the interface is more understandable. The page window also includes at least one secondary image, and the secondary image also includes at least one secondary static element for display in conjunction with the base image. Again, the secondary static element is for purposes of making the display more understandable and useful to the computer user, and it may combine with the base static element to form a more detailed structure for the user.

As used herein, terms such as "merger," "modify," "supress," "derive," "alter" and "combine" are used to indicate that the base image and secondary image undergo a process that displays or removes display elements included in the base image prior to presenting the page window to the computer user.

Figure 2A:
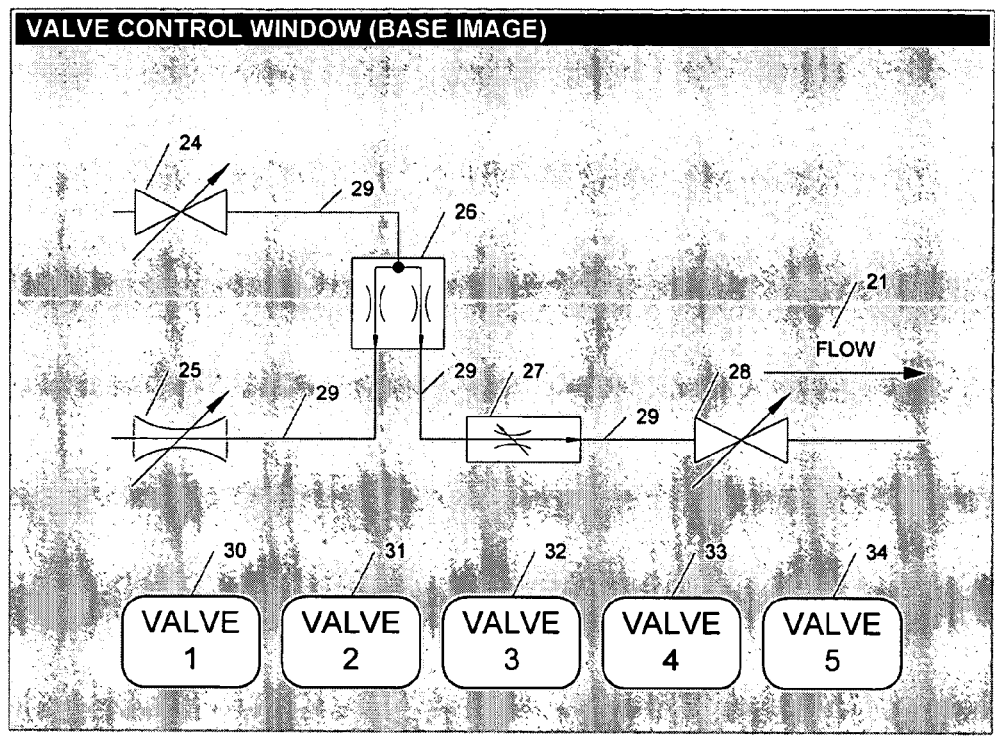
FIG. 2A is a base image with base control, static and status elements according to the present invention.

Referring to FIGS. 2A–2D, these concepts of the present invention will be described more fully. FIG. 2A is representative of a base image 20. A flow indicator symbol 21 is depicted on the base image 20, and this symbol is referred to as a base static element. In addition, pipe 29 would also be known as a base static element. Flow indicator symbol 21 and pipe 29 work in conjunction with each other to illustrate to the user that the page window controls pipe 29 and to further indicate the direction of fluid flow through the pipe 29.

The base image 20, as shown in FIG. 2A, further includes five base control elements. In this exemplary embodiment, the buttons VALVE 1–VALVE 5 30–34 are base control elements that the user can manipulate to control the valves 24–28.

The base image 20 further includes five base status elements. The valves 24–28 along the pipe 29 are base status elements. The base status elements will show the position of the valves (e.g., open or closed) as they are controlled by the buttons 30–34. In the exemplary embodiment, the user cannot manipulate the status element directly, but the status element is modified or changed based upon information received by the computer (i.e., input received via a control element) that is currently rendering the page window.

The present invention includes a plurality of secondary images used in conjunction with the base image. As with the base image, a secondary image includes at least one display element, e.g., a secondary control element, a secondary static element or a secondary status element, if not more. Typically, to cover all the functions for a particular computer controlled process, a plurality of secondary images is associated with a particular base image.

Figure 2B:
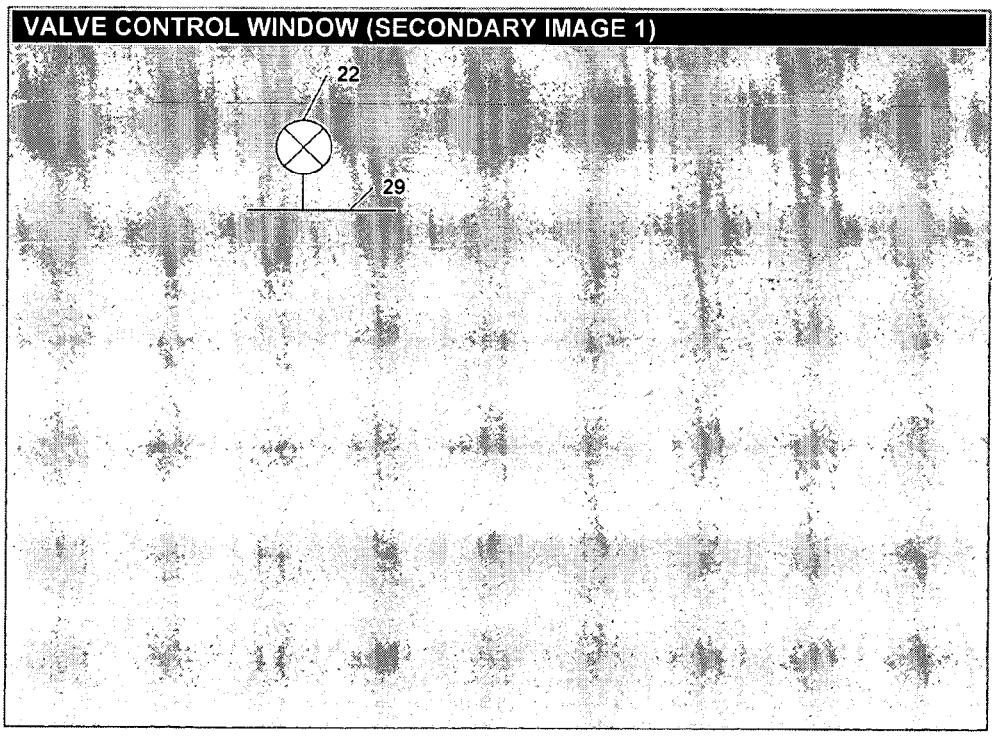
FIGS. 2B–2D are secondary images with secondary control, static and status elements according to the present invention.
Figure 3A:
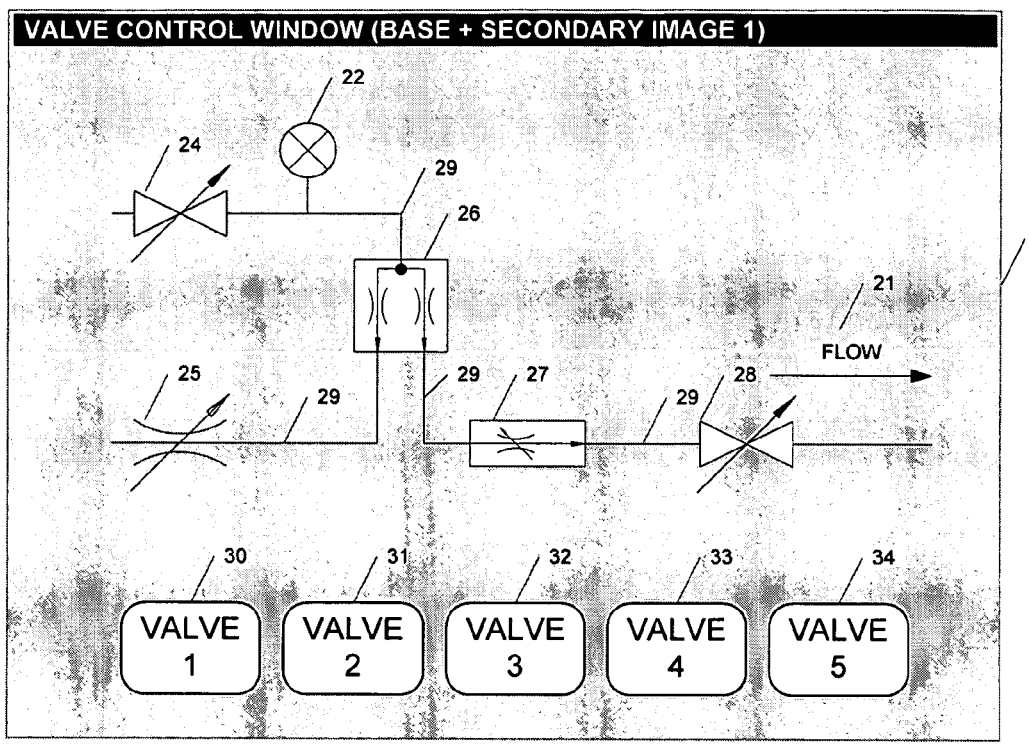
FIGS. 3A–3C are page windows, wherein a the base and secondary images have been merged together according to the present invention.

Referring to FIG. 2B, a typical secondary image will be described in detail. The secondary image 20A includes a new element not shown on the base image 20. A pressure gauge 22 is shown connected to pipe 29. The inclusion of the pipe 29 in secondary image 20A is not necessary, but it is shown for the sake of clarity. In addition, the valves 24–28 are not shown as they are already present on the base image 20. When base image 20 is merged with secondary image 20A, the result is illustrated in FIG. 3A as a page window 20D. The pressure gauge 22 is added to the final page window 20D. The base image is modified by the secondary image, thus presenting a page window 20D that combines elements from both the base and secondary images.

Figure 2C:
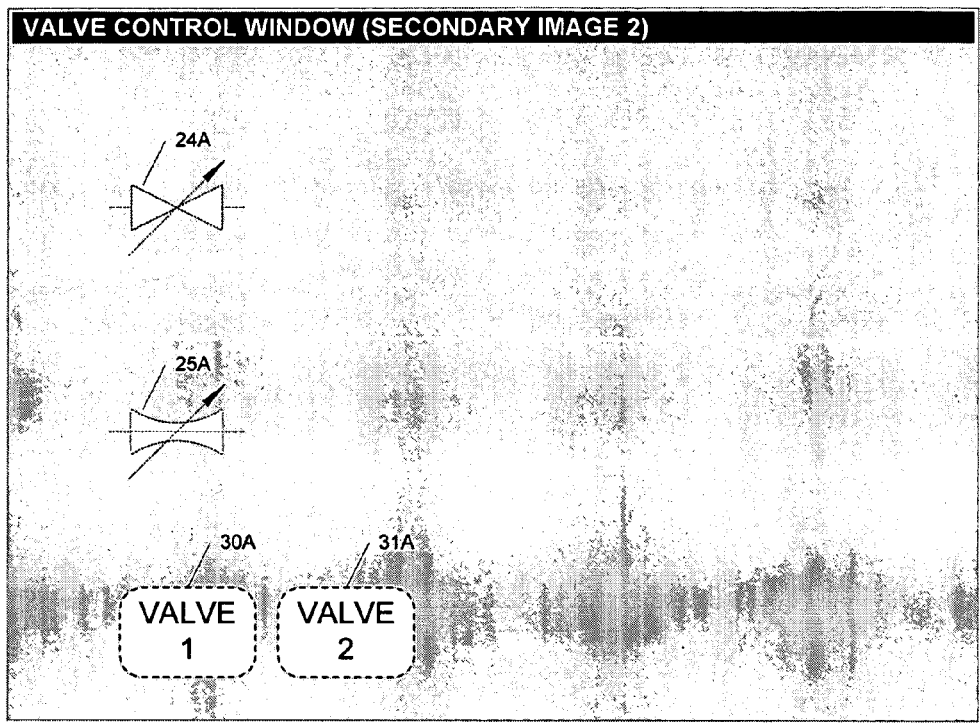
Figure 3B:
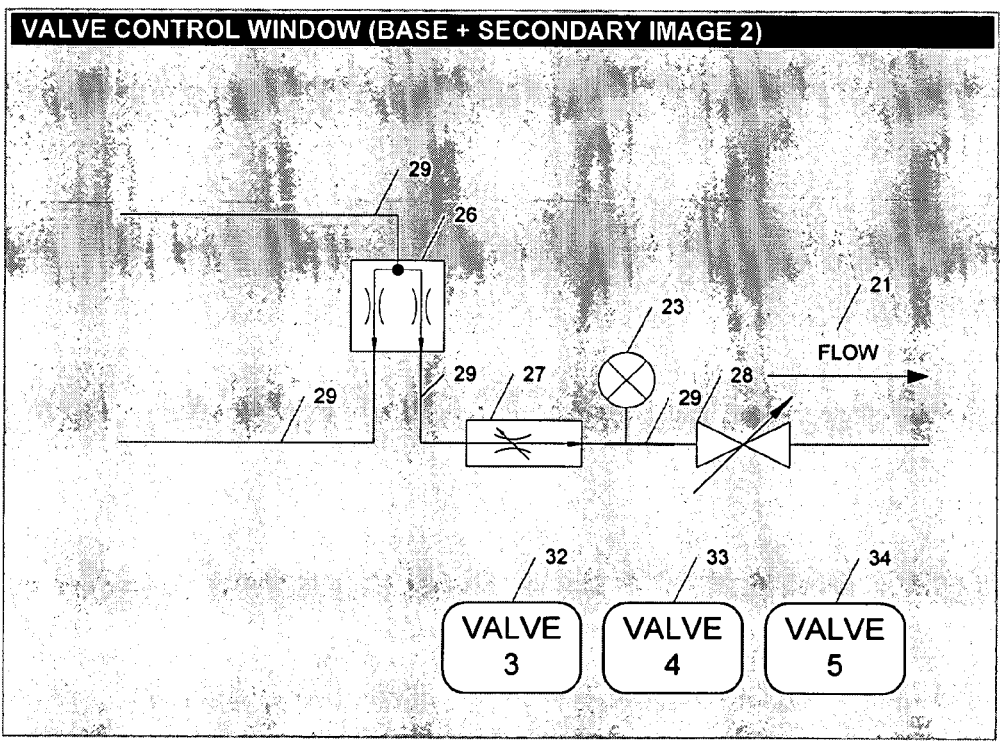

Referring to FIG. 2C, another typical secondary image will be described in detail. The secondary image 20B includes two valves (24A,25A) and two buttons (30A,31A) are illustrated in dotted lines. When base image 20 is merged with secondary image 20B, the result is illustrated in FIG. 3B as a page window 20E. The two valves (24,25) and two buttons (30,31) are not displayed in the final page window 20E. The removal of the valve and function key display elements allows the identical base image to be used for different page windows. The base image is modified by the secondary image, thus presenting a page window that has certain elements removed from the base image.

Figure 2D:
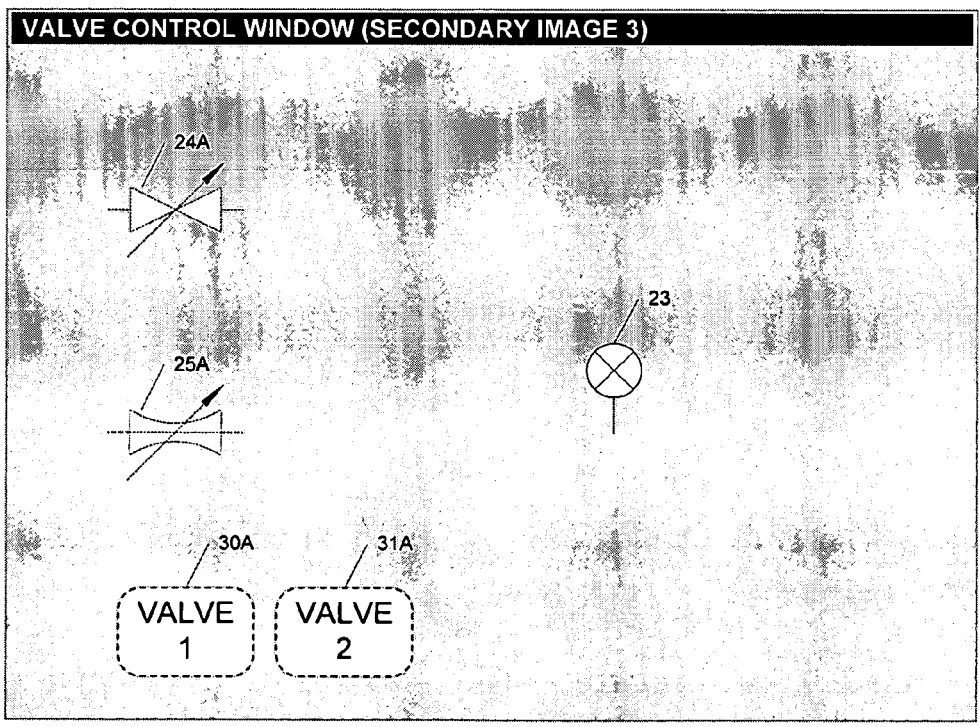
Figure 3C:
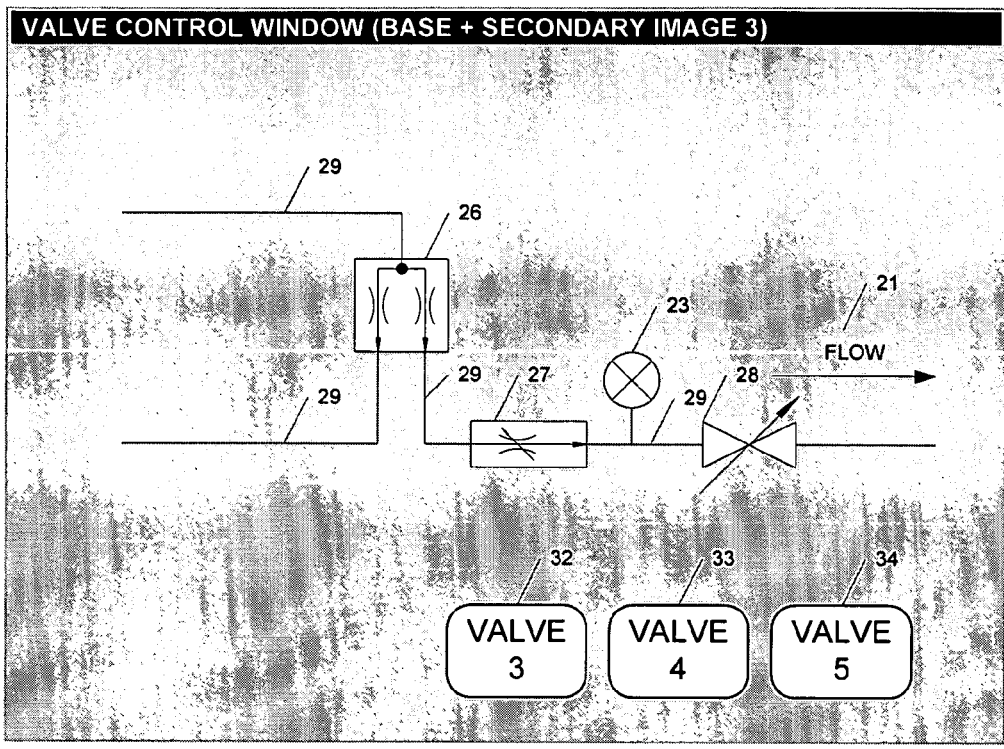

Referring to FIG. 2D, a third secondary image will be described in detail. The secondary image 20C includes a new element that is not part of the base image 20. A second pressure gauge 23 is shown connected to pipe 29, but not in the identical location as the pressure gauge 22 shown in FIG. 2B. Again, the inclusion of the pipe 29 in secondary image 20C is not necessary, as can be seen from the secondary image 20C. The valves 24–28 are not shown as they are already part of the base image 20. Two valves (24A,25A) and two buttons (30A,31A) are illustrated in dotted lines. When base image 20 is merged with secondary image 20C, the result is illustrated in FIG. 3C as a page window 20F. The pressure gauge 23 is added to the final page window, while two valves (24,25) and two buttons (30,31) are not displayed in the final page window 20F. The removal of the valve and button display elements allows the identical base image to be used for different page windows. Again, the base image display is altered by the secondary image, thus presenting a page window that combines elements from both the base and secondary images, in addition to presenting a page window that has certain elements removed from the base image.

As described above, the user manipulates the base or secondary control element or elements on a page window to affect a computer controlled process. The control elements on either type of image are responsive to stimuli from the user. These stimuli can be effected by any one of a known group of techniques, i.e., computer mouse, keyboard controls, touch screen, etc. In a similar manner, a computer-controlled process affects the base or secondary status elements on the page window. The status elements on either type of image are responsive to stimuli received from the computer-controlled process. Referring to FIG. 2A, the valves 24–28 would reflect the results of stimulating the buttons 30–34 to open or close the valves 24–28.

An additional feature of the present invention will now be described in greater detail. As mentioned above, and as shown in FIGS. 3B–3C, certain elements that were included in the base image 20 are not shown in the final page window that results from the merger between the base image and the secondary image. In the exemplary embodiment, a page window for a computer controlled process comprises a base image that includes at least one base image element responsive to either control or status stimuli, and a secondary image that includes at least one secondary image element responsive to either control or status stimuli. The page window is formed by the merger of the base image and the secondary image, and during the merger of the two images, the secondary image can "blank out" elements that are contained within the base image, or can add elements to those already presented by the base image.

Referring to FIG. 3B, this page window represents the merger of base image 20 and secondary image 20B. As mentioned above, two valves 24A,25A and two buttons 30A,31A are depicted in FIG. 2C are depicted with dotted lines. When base image 20 and secondary image 20B are merged, the two valves 24A,25A and two buttons 30A,31A are not presented on the screen image, as shown in FIG. 3B. The remaining elements on the base image 20 are not "blanked out" and are rendered in the final page window. Furthermore, any changes to the base image, as configured, will be reflected throughout all the merged page windows.

Figure 4A:
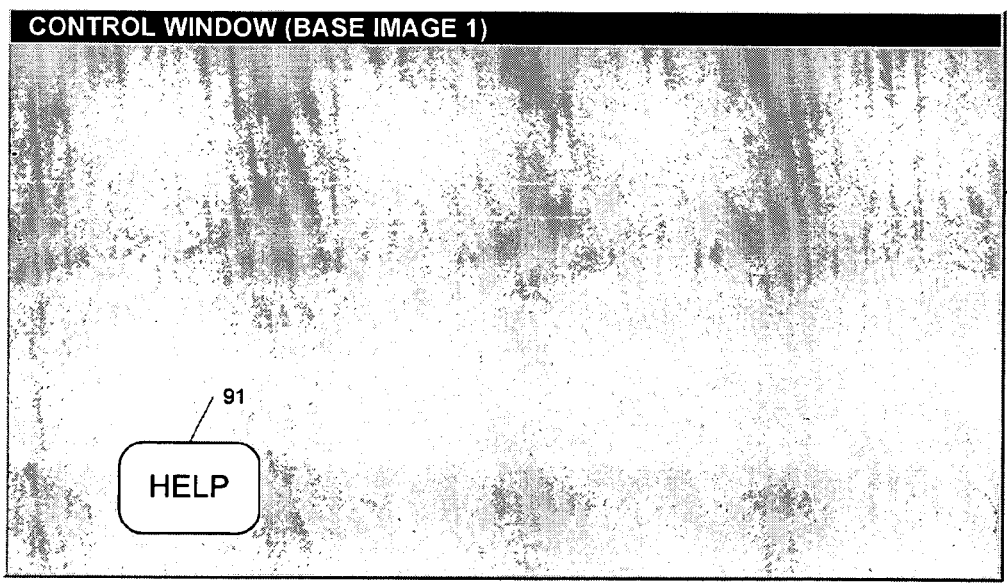
FIGS. 4A–4C are base images, each with base control elements according to the present invention.
Figure 4B:
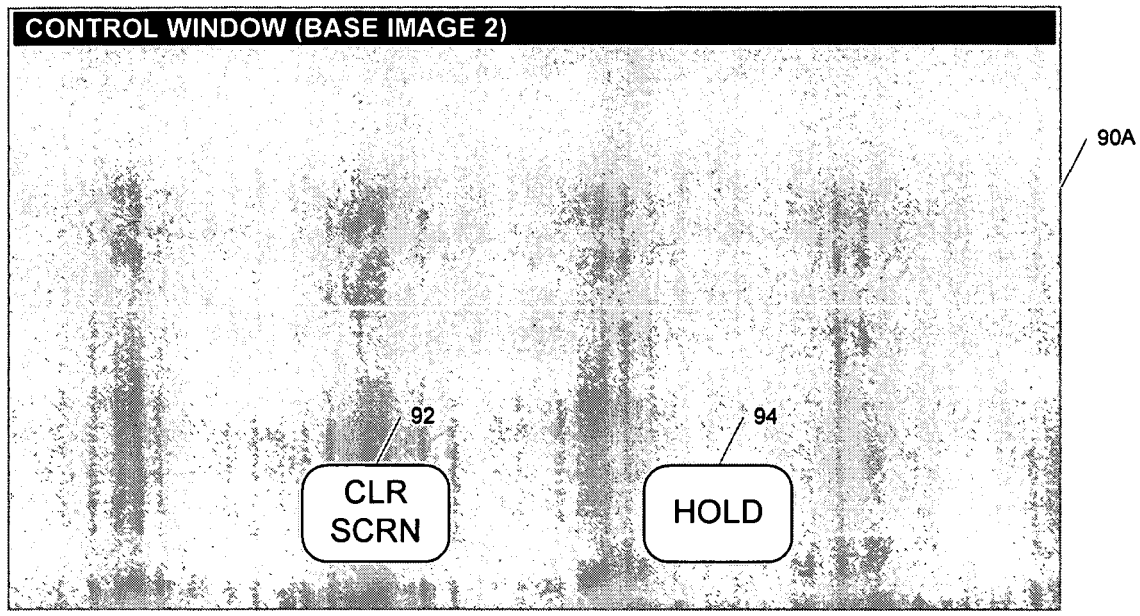
Figure 4C:
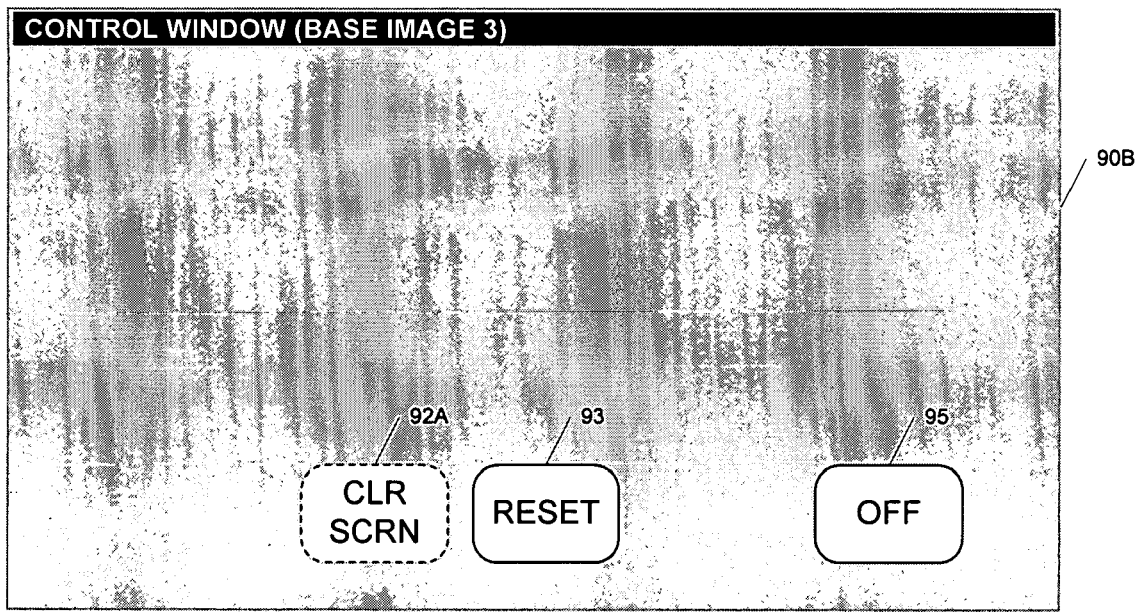

Referring to FIGS. 4A–4E, the derivation of a final base image from a plurality of base images will now be described in greater detail. FIGS. 4A–4C are three separate base images. Each base image 90–90B can be used on its own with other combinations of secondary images to arrive at a final picture window for presentation on the computer display screen. However, a potential implementation of the present invention on a computer system may require that a certain base control, static or status element must be present in every page window presented to the user. Referring to FIG. 4A, such a base image 90 is illustrated. For this example, the HELP button 91 is a base control element and is certainly a useful item that would likely be displayed in every page window presented to the computer user. In this example, only base control elements are used, but the concept applies equally to base static elements and base status elements, as well as combinations thereof.

Referring to FIGS. 4B–4C, other base images are illustrated. In FIG. 4B, a base image 90A with two base control elements, a button 92 entitled CLR SCRN and a button 94 entitled HOLD, is shown. In FIG. 4C, a base image 90B with three base control elements, a button 93 entitled RESET and a button 95 entitled OFF, is shown. The remaining base control element in FIG. 4C, a button 92A entitled CLR SCRN, is shown in dotted lines to indicate that the button 92A will suppress button 92 in FIG. 4B from being presented to the user on a computer display screen if base images shown in FIGS. 4B–4C are combined. In any event, even if these two base images 90A–90B are not combined, the base control element 92A would not be displayed.

Figure 4D:
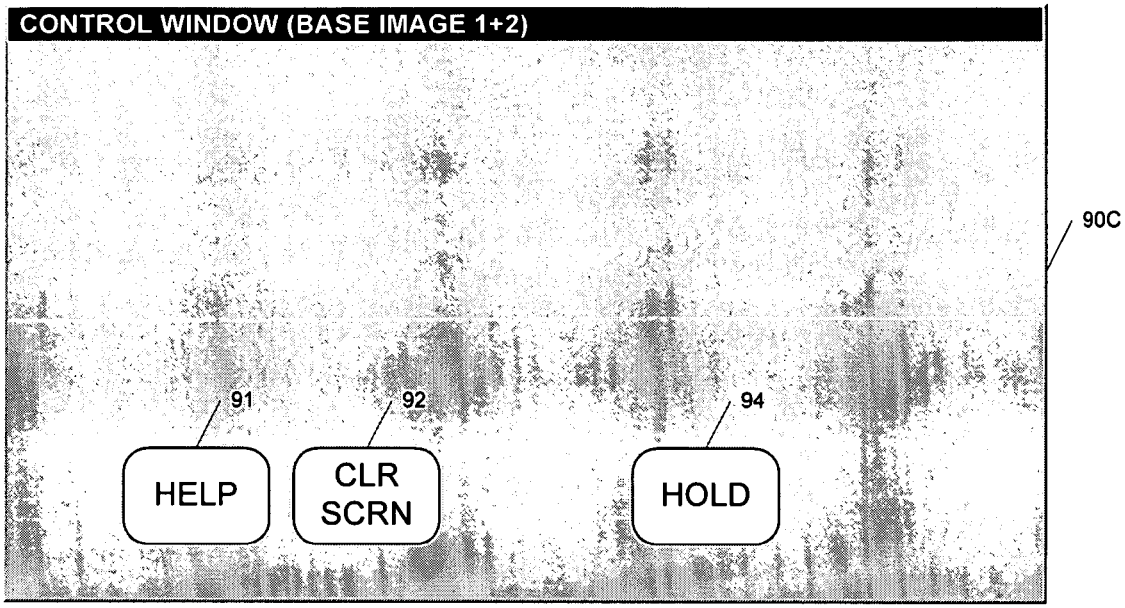
FIGS. 4D–4E are derived base images derived from the base images of FIGS. 4A–4C, wherein base control elements have been added or suppressed according to the present invention.

Referring to FIG. 4D, the merger of the base images illustrated in FIGS. 4A and 4B is depicted. The base control elements 91,92,94 embodied in each base image are merged together to form the final derived image depicted in FIG. 4D. An exemplary process for the merger of display elements will be described later.

Figure 4E:
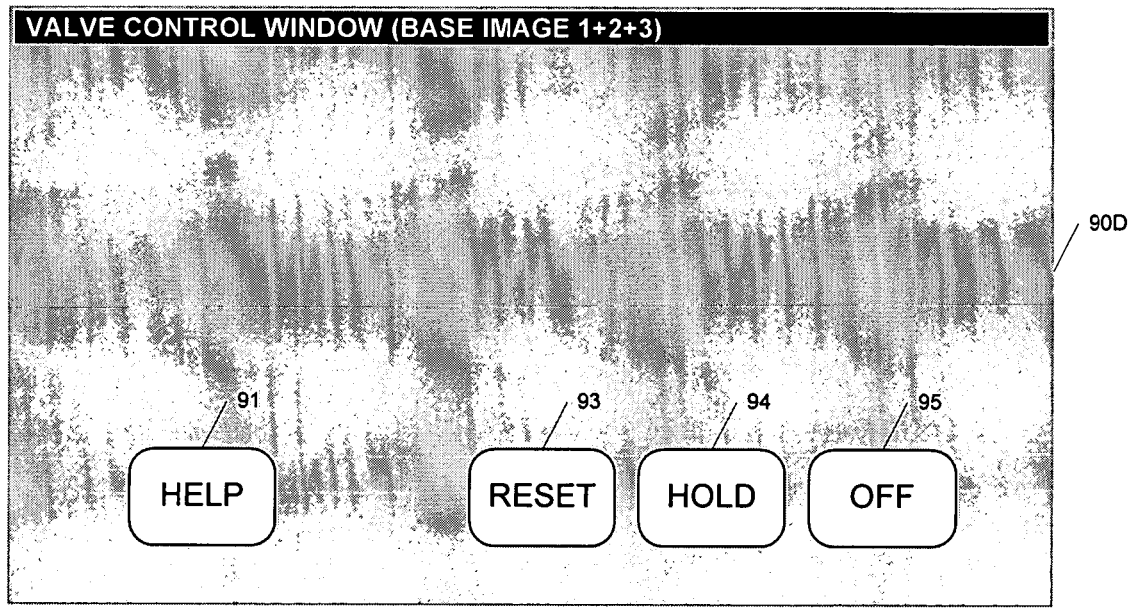

Referring to FIG. 4E, the merger of the base images illustrated in FIGS. 4A–4C is depicted. The base control elements 91–95 embodied in each base image are merged together to form the final derived image depicted in FIG. 4E. Note that one button 92, present in one of the base images 90A, is not presented in the final derived image 90D. This button 92 has been suppressed by the button 92A in the base image 90B illustrated in FIG. 4C. An exemplary process for the merger of display elements, including display element suppression, will be described later.

A second embodiment of the present invention will now be described in summary fashion. The present invention is also embodied in a method for displaying page windows for a computer controlled process on a computer display screen, wherein a base image composed of at least one base control, status or static element merges with a secondary image composed of at least one secondary control, status or static element. The merger of the base and secondary images forms a single page window wherein the display element are presented in a page window on a display terminal.

Figure 5:
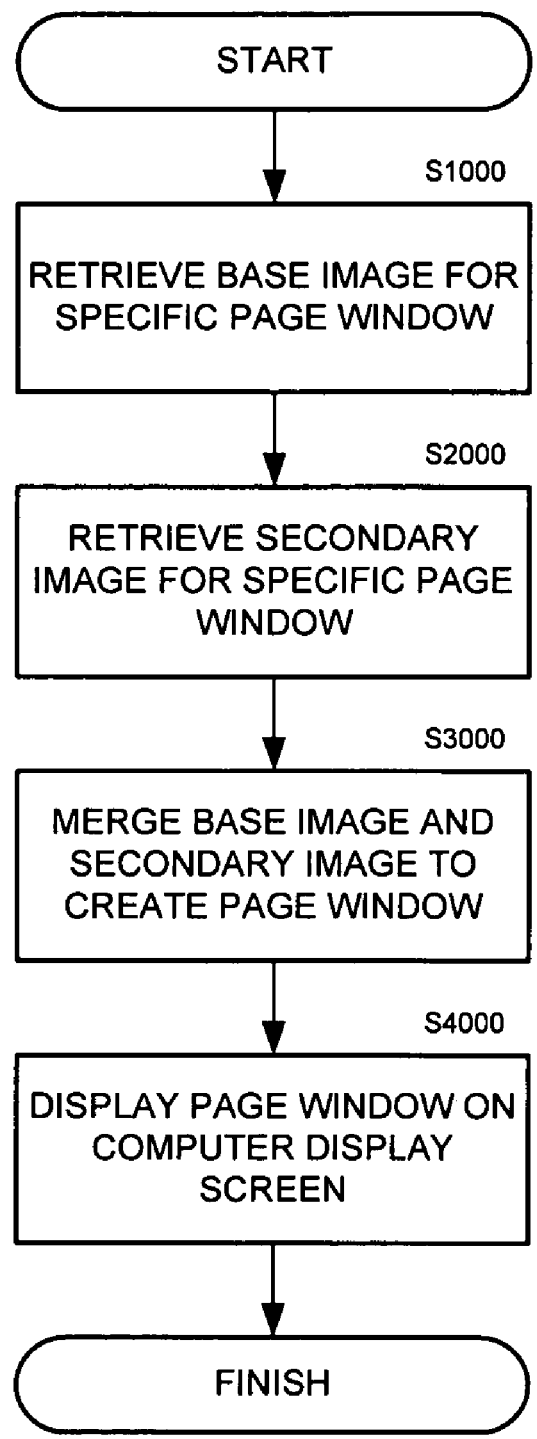
FIG. 5 depicts the process flow according to a preferred embodiment of the present invention.

Referring to FIG. 5, the second embodiment will now be described in greater detail. As shown by Step S1000, the base image for the specific page window is retrieved from storage. A more detailed description of the retrieval of the base image or images for a specific page window is illustrated in FIG. 5. As is known in the art, retrieving the base image from storage can entail accessing a hard disk, a RAID storage system, random access memory, read-only memory, a CD-ROM or a memory cartridge. This list is merely exemplary of the various storage media available and is not intended to be limiting in any way.

Figure 7:
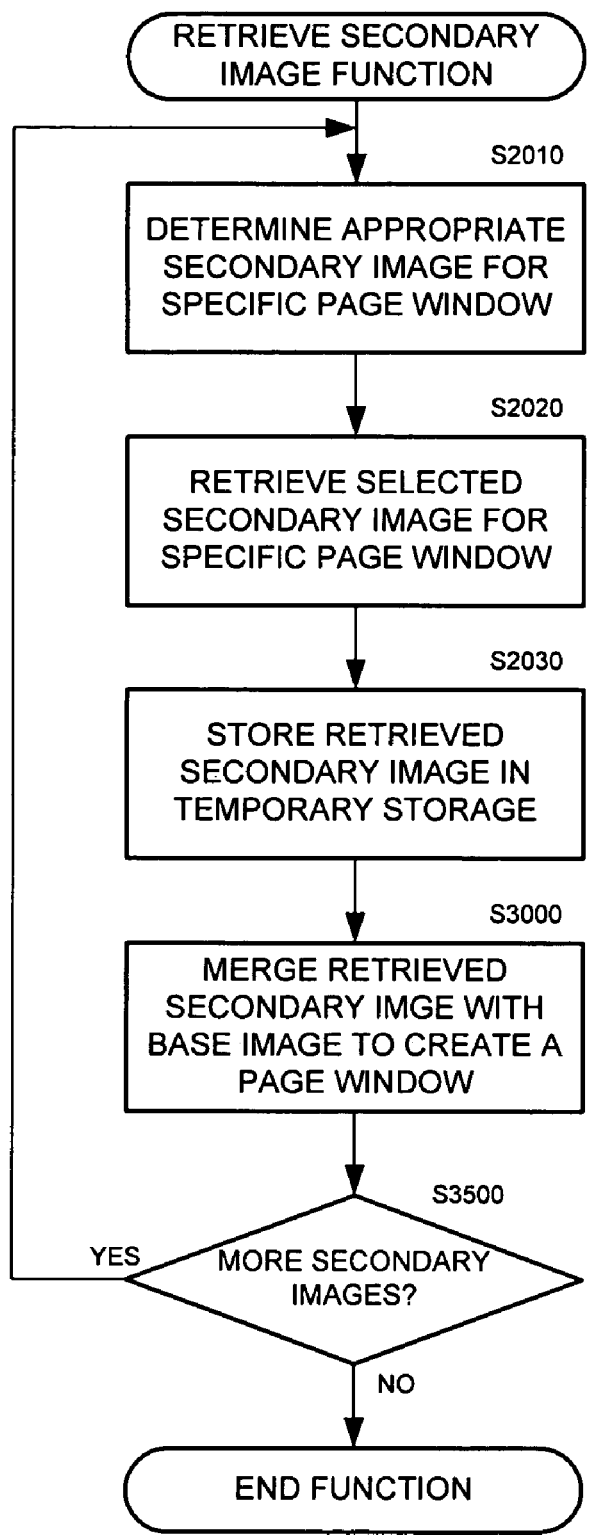
FIG. 7 depicts a process flow for retrieving secondary images for a page window according to a preferred embodiment of the present invention.

The next step in the method is retrieving the appropriate secondary image for the specific page window from storage and merging the retrieved secondary image with the retrieved base image, as shown by Step S2000. The retrieved secondary image is specific to the page window, and the secondary image is specific to a particular portion of a computer-controlled process. A more detailed description of the retrieval of the secondary image or images for a specific page window is illustrated in FIG. 7. As is known in the art, retrieving the base image from storage can entail accessing a hard disk, a RAID storage system, random access memory, read-only memory, a CD-ROM or a memory cartridge, etc.

Figure 8:
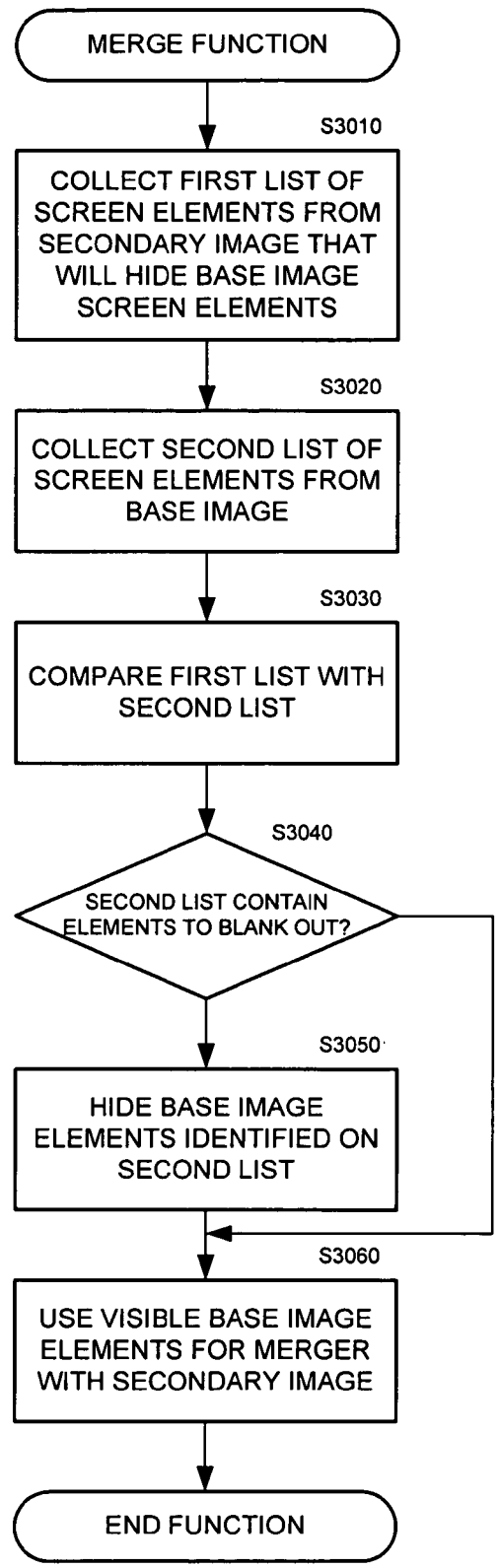
FIG. 8 depicts a process flow for merging base images and secondary images for a page window according to a preferred embodiment of the present invention.

In the next step, the base image elements and the secondary image elements are merged to form a final page window, as shown by Step S3000. As described above, all the base image elements are displayed, except for those designated by the secondary image to be blanked out. A more detailed description of the merging of a base image with a secondary image is illustrated in FIG. 8. In addition, the secondary image may add additional elements for display in conjunction with the base image elements.

The final step of the method is displaying the merged image on the computer display screen, as shown by Step S4000. The page window rendered on the computer display screen contains elements that are present in both the base image and the secondary images.

Figure 6:
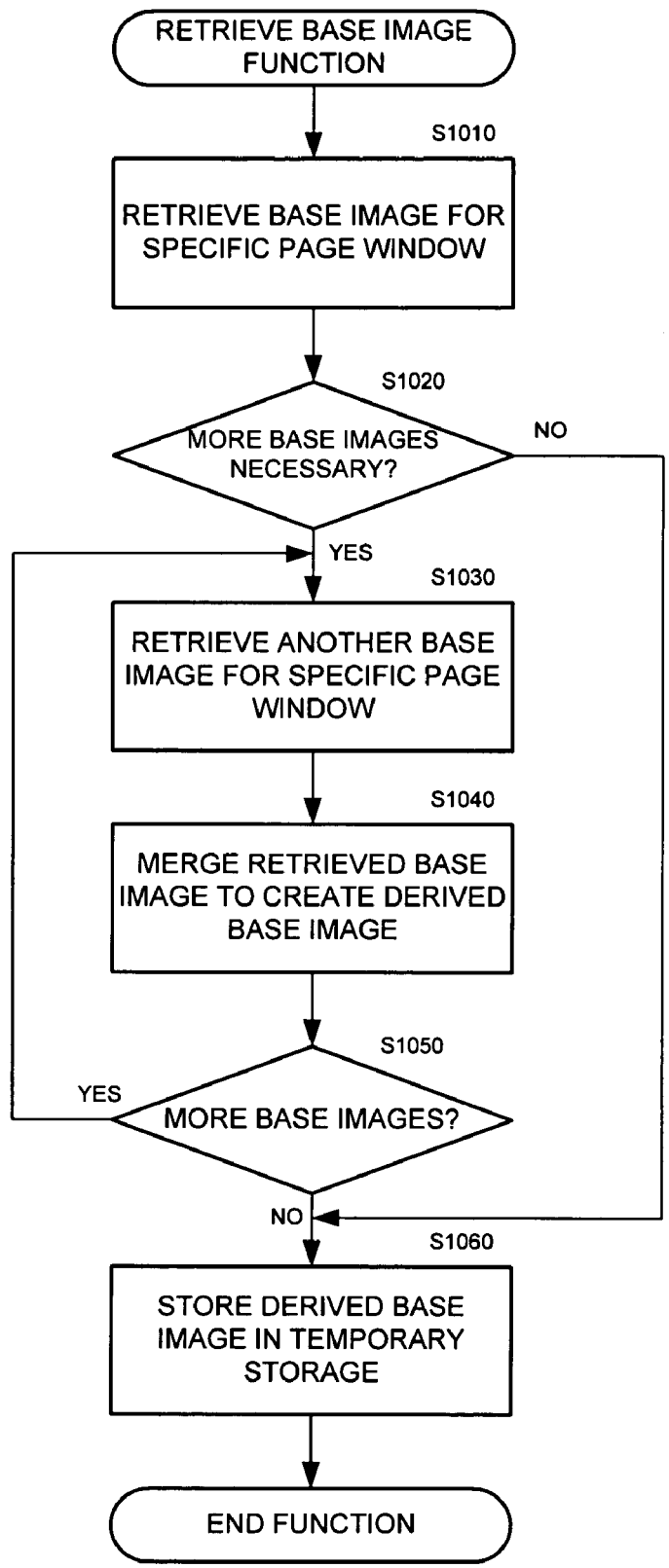
FIG. 6 depicts a process flow for retrieving base images for a page window according to a preferred embodiment of the present invention.

Referring to FIG. 6, the step of retrieving base images for a specific page window will be described in further detail. As shown in Step S1000, the base image for a specific page window is retrieved from storage. As an option, the retrieved base image can be stored in a display memory (not shown). Typically, a display memory is separate from the memory used by a computer system for general storage. However, it is understood that the display memory which stores the retrieved base image can be memory used by the computer system for general storage of applications and data.

In FIG. 6, as Step S1020, the method determines whether any more base images are required to be merged together to form the final base image. It is an important feature of the present invention that one image, or a multiplicity of images can be used as the base image. If only a single image is required for a specific page window, then only one image is retrieved from storage, and, at Step S1060, the base image is stored in temporary memory. If more than one base image is required to derive the final base image, then the method progresses to Step S1030.

If another base image is required for the derived final base image, then, at Step S1030, another base image specific to the page window being derived is retrieved from storage. As discussed above, the base image retrieved is specific to the portion of the computer-controlled process currently being executed. At Step S1040, the newly retrieved base image is merged with the base image retrieved at Step S1050, thereby deriving a new base image for the page window.

Referring to FIG. 6, at Step S1050, if more base images are required to derive the base image, then the method returns to Step S1030 to retrieve more base images from storage to derive the final base image for the page window. If it is not necessary to retrieve more images to create the base image, then, at Step S1060, the final base image is stored in temporary storage.

There is no limitation that the final base image must be derived contemporaneously with the retrieval of base images. The present invention supports the run-time derivation of a final base image by the operational software of a computer system, as well as the downloading of previously derived base images, where the derivation was performed off-line and the final base images subsequently downloaded. If memory constraints are a practical consideration and operational speed is not a great concern, then run-time derivation of final base images is the preferred option. Run-time derivation provides the added feature of allowing changes to be made to any base or secondary image, and allowing the outcome to be examined immediately. Conversely, if operational speed is of paramount concern and memory space is not a limiting factor, then off-line derivation is the preferred route. These options apply to the creation of page windows using base images and secondary images as well. It is understood, however, that these operational concerns are not in any way limiting on the invention and should not be construed as such.

Referring to FIG. 7, the step of retrieving secondary images for a specific page window will be described in further detail. In Step S2010, the method determines the appropriate secondary image for the specific page window that is being created. As discussed above, the secondary image is linked to the specific portion of the computer-controlled process being controlled and/or monitored. In Steps S2020–30, the selected secondary image is retrieved from storage, and then stored in temporary storage.

In Step S3000, the base image and the retrieved secondary image are merged to form a final page window. The base image and the secondary image may include control elements, static elements and status elements. As described above, the elements incorporated in the retrieved base image are merged with the elements of the retrieved secondary image. Selected elements of the base image may be blanked out by elements of the secondary image, thereby resulting in a page window that has only a portion of the base image elements displayed. The steps of merging in the preferred embodiment are illustrated in FIG. 8.

Following Step S3000, at Step S3500 the method determines if there are additional secondary images that must be merged with the base image to create the final page window to be rendered on the computer display terminal. If more secondary images are required, then Steps S2010–S3000 are executed again until the final page window is assembled. If all the necessary secondary images have been merged with the base image, then, as shown in FIG. 5, in Step S4000, the merged base image and secondary image or images are displayed on a computer display screen as a final page window. Again, the final page window is a combination of elements resulting from the merger of the base image and the secondary image.

Referring to FIG. 8, the merge function between a base image and a secondary image will now be described in greater detail. At Step S3010, the method first examines the secondary image to determine if the secondary image contains any display elements that will blank out display elements contained in the base image, and creates a first list enumerating these "blanking" elements. At Step S3020, the method creates a second list of the base image display elements (e.g., control, static or status elements) for comparison with the display elements contained in the base image.

At Step S3030, the method compares the first list with the second list. At Step S3040, the method determines if the second list contains display elements that should be blanked out. If there are such "blanked out" elements, then, at Step S3050, the base image elements so identified are blanked out in the final page window. Otherwise, in Step S3060, the base image elements and the secondary image elements are merged together to create the final page window. A similar process is used when deriving a final base image from a plurality of base images. As described earlier, the derivation of a final base image can be performed at run-time or off-line.

Various exemplary embodiments of computer systems that embody the present invention will now be discussed. Those skilled in the art will recognize that countless configurations of a computer system are possible, and nothing in FIGS. 9 and 10 should be interpreted as limiting the present invention to the computer systems or system configurations described herein.

Figure 9:
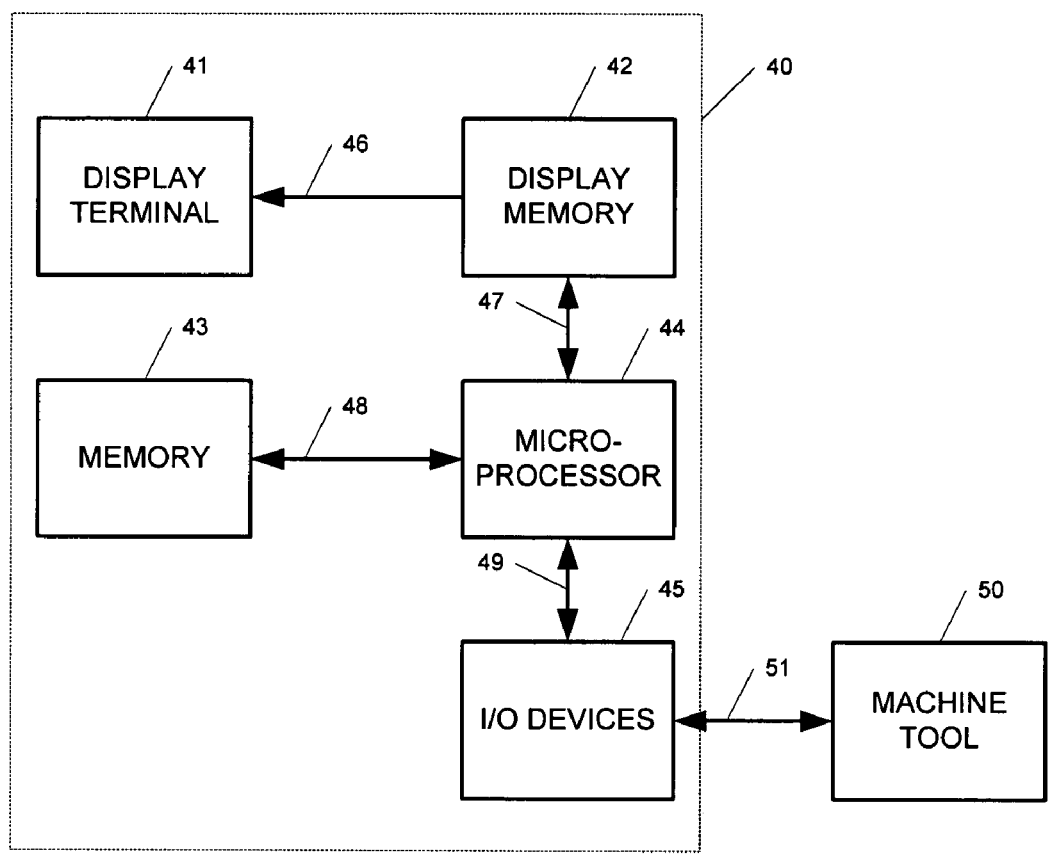
FIG. 9 illustrates a preferred embodiment of a computer system.

Referring to FIG. 9, an exemplary embodiment of a computer system 40 is depicted, including a display terminal 41, a display memory 42, a memory 43, a microprocessor 44 and I/O devices 45. The computer system further includes various busses 46–49 to interconnect the components. The memory 43 further includes software instructions adapted to enable the computer system 40 to perform the steps of the invention as described. For this exemplary embodiment, the computer system 40 is controlling the actions of a machine tool 50. It is understood that this exemplary embodiment is not limited to a computer system controlling a machine tool, but the present invention can be applied to virtually any computer-controlled apparatus or process.

Figure 10:
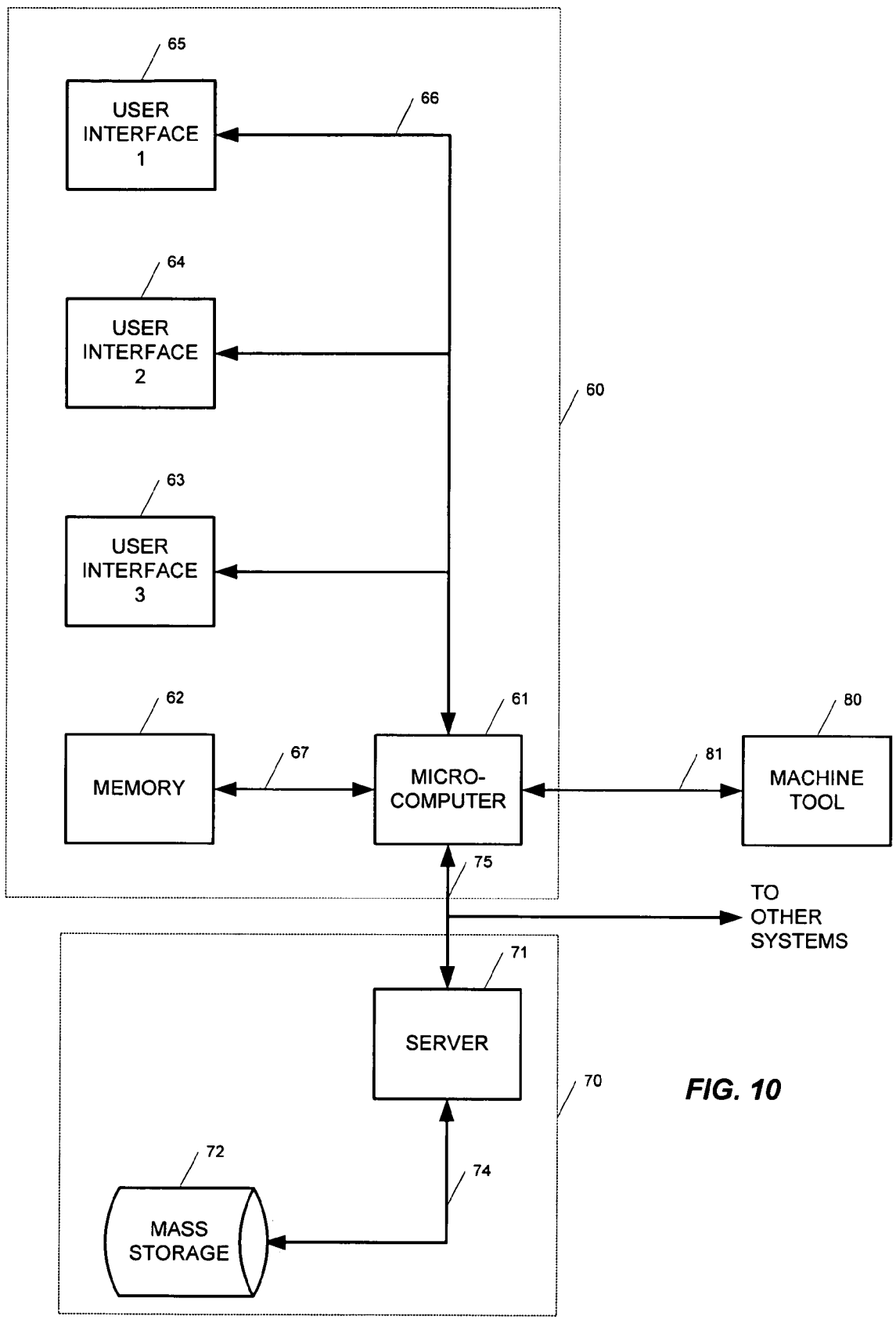
FIG. 10 illustrates a preferred embodiment of a computer system interfaced with a server system.

Referring to FIG. 10, a computer system 60 that is connected to a server will now be described. The computer system 60 includes a microcomputer 61, a memory 62 and several user interfaces 63–65. The memory is connected to the microcomputer via memory bus 67. Each user interface includes a keyboard, a display screen and display memory (not shown). The user interfaces 63–65 are dispersed from each other, and allow the user to interface with the microcomputer 61 at different locations. The user interfaces 63–65 are connected to the microcomputer 61 via an interface bus 66.

The server system 70 includes a server 71, a memory 72,73 and a memory bus 74 linking the server 71 and memory 72,73 together. The server is accessed by the customary user interfaces (not shown). The server system 70 is connected to the computer system 60 by way of an interface link 75, which is a conventional data link (e.g., Ethernet, twisted pair, FTP, HTTP, etc.) as is known in the art. The server system 70 can be connected to multiple computer systems and supply images of the present invention to the multiple computer systems. The images used by the present invention can be stored on the server system 70 and transferred to the computer system 60 over the interface link 75. In this embodiment, the server system 70 acts as a configuration system and maintains a configured set of images for use by the computer system 60.

The computer system 60 is also connected to machine tool 80 by way of a communications link 81, which is a conventional data link (e.g., Ethernet, twisted pair, FTP, HTTP, etc.) as is known in the art. In this exemplary embodiment, the computer system 60 extracts from the server system 70 the base images and secondary images required for the operation of the machine tool 80. As described above, the base and secondary images may be embodied on any number of different mediums (e.g., floppy disk, hard disk, optical disk, cartridge, tape, CD-ROM, writable CD, etc.) as are known in the art. In this way, the server system 70 operates as a central repository for several computer systems, thereby maintaining a consistent set of images between multiple machine tools. The memory 62 further includes software instructions adapted to enable the computer system 60 to perform the steps of the invention as described. It is understood that this exemplary embodiment is not limited to a computer system controlling a machine tool, but the present invention can be applied to virtually any computer-controlled apparatus or process.

A third embodiment of the present invention is a computer system adapted to displaying images for a computer-controlled process on a computer display screen. The computer system includes a processor and a memory storing software instructions adapted to enable the computer system to retrieve and merge a base image composed of at least one base image element with at least one secondary image composed of at least one secondary image element. The software instructions further enable the computer system to display the merged base image and secondary image as a page window on a computer display screen.

Typically, a computer system uses a display memory for storing images and data that will be presented to the user. In this exemplary embodiment, the computer system retrieves the base image and stores it in a display memory. As discussed earlier, the display memory can be a memory physically separate from other memory (e.g., RAM, hard disk, etc.) that is used by the computer for storage. Alternatively, the display memory can simply be a portion of a memory storage device that is designated for data and images to be displayed, while the computer uses the other portions of the memory storage device for storing other data and applications. In the exemplary embodiment, both the retrieved base image and the retrieved secondary image are stored in a display memory. As noted in the definitions earlier, the base image and each secondary image can include control elements, static elements and/or status elements.

The computer system adapted for displaying the images retrieves the secondary image that is associated with a particular portion of the computer-controlled process. It is likely that one using the present invention will create a plurality of secondary images to be combined with the base image. The software instructions must command the computer system to retrieve the appropriate secondary image to be combined with the base image. Typically, file retrieval and file association functions are common components of computer operating systems and will not be discussed.

As discussed above, the computer system combines the base image elements with the secondary image elements, thereby creating a page window for display to the computer user. The computer system accomplishes this task in two ways. First, the selected secondary image elements blank out selected base image elements during the combination. That is, selected base image elements are not shown in final page window presented to the user, due to secondary image elements that prevent the display of the selected base image elements. Alternatively, the computer system adds the secondary image elements to the base image elements, thereby creating a page window with both sets of elements visible. The steps for blanking out and combining display elements as illustrated in FIG. 8 are suitable for this embodiment, but it is understood that the steps of FIG. 8 are not limiting in any fashion.

A fourth embodiment of the present invention is a computer program product for enabling a computer to page windows for a computer-controlled process on a computer display screen. The computer program product, as used by the invention, was described previously. The computer program product includes software instructions for enabling the computer to perform predetermined operations, and a computer readable medium bearing the software instructions. The predetermined operations embodied on the computer readable medium include retrieving and merging a base image composed of base image elements with a secondary image composed of secondary image elements. The computer readable medium bears the predetermined operation of displaying the merged base image and secondary image as a single image on a computer display screen.

As described above, a computer system uses a display memory for storing images and data that will be presented to the user. In this exemplary embodiment, the predetermined operations on the software medium instruct a computer system to retrieve the base image and store it in a display memory. In this exemplary embodiment, the predetermined operations on the software medium instruct a computer system to store both the retrieved base image and the retrieved secondary image on a display memory. As noted in the definitions earlier, the base image and each secondary image can include control elements, static elements and/or status elements.

The predetermined operations on the software medium instruct a computer system to retrieve the secondary image that is associated with a particular portion of the computer-controlled process. It is likely that one using the present invention will create a plurality of secondary images to be combined with the base image. The predetermined operations command the computer system to retrieve the appropriate secondary image to be combined with the base image. Typically, file retrieval and file association functions are common components of computer operating systems and will not be discussed.

As discussed above, the predetermined operations on the software medium instruct a computer system to combine the base image elements with the secondary image elements, thereby creating a single image for display to the computer user. The predetermined operations accomplish this task in two ways. First, the selected secondary image elements blank out selected base image elements during the combination. That is, selected base image elements are not shown in the final page window presented to the user, due to secondary image elements that prevent the display of the selected base image elements. Alternatively, the predetermined operations on the software medium instruct a computer system to add the secondary image elements to the base image elements, thereby creating a page window with both sets of elements visible. The steps for blanking out and combining display elements as illustrated in FIG. 8 are suitable for this embodiment, but it is understood that the steps of FIG. 8 are not limiting in any fashion.

A fifth embodiment of the present invention is a computer system adapted to displaying images for a computer-controlled process on a computer display screen, with a memory storing software instructions adapted to enable the computer system to retrieve and merge a base image composed of at least one base image element, responsive to control or status stimuli, with at least one secondary image composed of at least one secondary image element that is responsive to control or status stimuli. The software instructions further enable the computer system to display the merged base image and secondary image as a page window on a computer display screen.

In this exemplary embodiment, the computer system retrieves the base image with the responsive regions and stores it in a display memory, and performs an analogous operation with regard to the secondary image containing responsive regions. As noted in the definitions earlier, the base image and each secondary image can include control elements, static elements and/or status elements; however, the static elements would not be responsive to any stimuli.

The computer system combines the base image elements with the secondary image elements, thereby creating a single image containing elements responsive to control or status stimuli for display to the computer user. The computer system accomplishes this task in two ways. First, the selected secondary image elements blank out selected base image elements during the combination, thereby preventing them from responding to any stimuli. That is, selected base image elements are not shown in final page window presented to the user, due to secondary image elements that prevent the display of the selected base image elements. Alternatively, the computer system adds the secondary image elements to the base image elements, thereby creating a page window with both sets of elements visible and reactive to stimuli. The steps for blanking out and combining display elements as illustrated in FIG. 8 are suitable for this embodiment, but it is understood that the steps of FIG. 8 are not limiting in any fashion.

A sixth embodiment of the present invention is a computer program product for enabling a computer to display page windows for a computer-controlled process on a computer display screen, wherein the predetermined operations embodied on the computer readable medium include retrieving and merging a base image composed of base image elements, responsive to control or status stimuli, with a secondary image composed of secondary image elements that are responsive to control or status stimuli. The computer readable medium bears the predetermined operation of displaying the merged base image and secondary image as a single page window, reactive to control or status stimuli on a computer display screen.

In this exemplary embodiment, the predetermined operations on the software medium instruct a computer system to retrieve the base and secondary images and store them in a display memory. As noted in the definitions earlier, the base image and each secondary image can include control elements, static elements and/or status elements. Of course, the control and status elements are the only elements reactive to stimuli, whereas the static elements are not reactive.

As discussed above, the predetermined operations on the software medium instruct a computer system to combine the base image elements with the secondary image elements, thereby creating a single image for display to the computer user. The predetermined operations accomplish this task in two ways. First, the selected secondary image elements blank out selected base image elements during the combination, thus preventing any reaction to stimuli. That is, selected base image elements are not shown in final page window presented to the user, due to secondary image elements that prevent the display of the selected base image elements. Alternatively, the predetermined operations on the software medium instruct a computer system to add the secondary image elements to the base image elements, thereby creating a page window with both sets of elements visible, and the visible elements are reactive to stimuli. The steps for blanking out and combining display elements as illustrated in FIG. 8 are suitable for this embodiment, but it is understood that the steps of FIG. 8 are not limiting in any fashion.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application, to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A page window for a computer display screen, comprising:
   a base image comprising at least one base image element, wherein the base image element is at least one of a base control element, a base static element and a base status element for display on the page window; and
   at least one secondary image comprising at least one secondary image element, wherein the secondary image element is at least one of a secondary control element, a secondary static element and a secondary status element for display on the page window,
   wherein the at least one secondary image completely overlays the base image and the base image element and is merged with the base image, thereby creating the page window, and during the merger, if a base image element has a corresponding secondary image element, the merger blanks out both the base image element and the corresponding secondary image element from the created page window.

2. The page window as claimed in claim 1, wherein the base image is derived from a plurality of base images.

3. The page window as claimed in claim 1, wherein the at least one secondary image comprises a plurality of secondary images.

4. A plurality of page windows for a computer controlled process, each page window comprising:
   a base image, comprising at least one base image element, that forms the background for the plurality of page windows presented by the computer controlled process, wherein the base image element is at least one of a base control element, a base static element and a base status element; and
   a plurality of secondary images, each secondary image comprising at least one secondary image element, wherein the secondary image element is at least one of a base control element, a base static element and a base status element,
   wherein each of the plurality of page windows presented by the computer controlled process is formed by a merger of at least one of the plurality of secondary images with the base image, wherein the plurality of secondary images completely overlay the base image, thereby creating each page window, and during the merger of a secondary image with the base image, if a base image element has a corresponding secondary image element, the merger blanks out both the base image element and the corresponding secondary image element from the created page window.

5. The plurality of page windows as claimed in claim 4, wherein the base image is derived from a plurality of base images.

6. A page window for a computer controlled process, comprising:
   a base image comprising at least one base image element responsive to either control or status stimuli; and
   a plurality of secondary images, wherein at least one of the plurality of secondary images comprises at least one secondary image element responsive to either control or status stimuli,
   wherein one of the plurality of secondary images completely overlays the base image and the base image element and is merged with the based image, thereby creating the page window, and during the merger, if a base image element has a corresponding secondary image element, the merger blanks out both the base image element and the corresponding secondary image element from the created page window.

7. The page window for a computer controlled process as claimed in claim 6, wherein the base image further comprises at least one base static element.

8. The page window for a computer controlled process as claimed in claim 6, wherein at least one of the plurality of secondary images further comprises at least one secondary static element.

9. The page window for a computer controlled process as claimed in claim 6, wherein the at least one secondary image element responsive to control stimuli modifies the at least one base image element responsive to control stimuli.

10. The page window for a computer controlled process as claimed in claim 6, wherein the at least one secondary image element responsive to status stimuli modifies the at least one base image element responsive to status stimuli.

11. The page window for a computer controlled process as claimed in claim 6, wherein the base image is derived from a plurality of base images.

12. A method for displaying page windows for a computer controlled process on a computer display screen, the method comprising:
    retrieving a base image composed of at least one base image element from storage;
    retrieving a secondary image composed of at least one secondary image element from storage;
    merging the retrieved base image with the retrieved secondary image to form a page window, wherein the retrieved secondary image completely overlays the retrieved base image and is merged with the base image, thereby creating the page window, and during the merger, if a base image element has a corresponding secondary image element, the merger blanks out both the base image element and the corresponding secondary image element from the created page window; and
    displaying the page window on a computer display screen.

13. The method for displaying images for a computer controlled process on a computer display screen as claimed in claim 12, wherein retrieving a base image further comprises loading the retrieved base image into a display memory.

14. The method for displaying images for a computer controlled process on a computer display screen as claimed in claim 12, wherein retrieving a secondary image further comprises determining which secondary image to retrieve from a plurality of secondary images.

15. The method for displaying images for a computer controlled process on a computer display screen as claimed in claim 12, wherein retrieving a secondary image further comprises storing the retrieved secondary image in display storage.

16. The method for displaying images for a computer controlled process on a computer display screen as claimed in claim 12, wherein retrieving a base image further comprises retrieving a base image that includes at least one of a base control element, a base static element and a base status element.

17. The method for displaying images for a computer controlled process on a computer display screen as claimed in claim 12, wherein retrieving a secondary image further comprises retrieving a secondary image that includes at least one of a secondary control element, a secondary static element and a secondary status element.

18. The method for displaying images for a computer controlled process on a computer display screen as claimed in claim 12, wherein retrieving a base image further comprises deriving a final base image from a plurality of base images.

19. A computer system adapted to displaying page windows for a computer controlled process on a computer display screen, including:
 a processor;
 a memory comprising software instructions that to enable the computer system to:
  retrieve a base image composed of at least one base image element from storage;
  retrieve a secondary image composed of at least one secondary image element from storage;
  merge the retrieved base image with the retrieved secondary image, thereby creating a page window, wherein the retrieved secondary image completely overlays the retrieved base image, thereby creating the page window, and during the merger, if a base image element has a corresponding secondary image element, the merger blanks out both the base image element and the corresponding secondary image element from the created page window; and
  display the page window on a computer display screen.

20. The computer system adapted to displaying images for a computer controlled process as claimed in claim 19, wherein retrieving a base image further comprises retrieving a base image that includes at least one of a base control element, a base static element and a base status element.

21. The computer system adapted to displaying page windows for a computer controlled process as claimed in claim 19, wherein retrieving a secondary image further comprises retrieving a secondary image that includes at least one of a secondary control element, a secondary static element and a secondary status element.

22. The computer system adapted to displaying page windows for a computer controlled process as claimed in claim 19, wherein retrieving a base image further comprises deriving a final base image at run-time from a plurality of base images prior to retrieval.

23. A computer program product for enabling a computer to display page windows for a computer controlled process on a computer display screen, comprising:
 software instructions for enabling the computer to perform predetermined operations, and a tangible computer readable medium encoded with the software instructions;
 wherein the predetermined operations comprise:
  retrieving a base image composed of at least one base image element from memory;
  retrieving a secondary image composed of at least one secondary image element from memory;
  merging the retrieved base image with the retrieved secondary image, wherein the retrieved secondary image completely overlays the retrieved base image, thereby creating the page window, and during the merger, if a base image element has a corresponding secondary image element, the merger blanks out both the base image element and the corresponding secondary image element from the created page window; and
  displaying the page window on a computer display screen.

24. A method for presenting a page window for a computer controlled process, wherein the method comprises:
 retrieving a base image comprising at least one base image element responsive to either control or status stimuli;
 retrieving a secondary image comprising at least one secondary image element responsive to either control or status stimuli;
 merging the base image and secondary image, wherein the retrieved secondary image completely overlays the retrieved base image, thereby creating the page window, and during the merger, if a base image element has a corresponding secondary image element, the merger blanks out both the base image element and the corresponding secondary image element from the created page window; and
 displaying the page window.

25. The method for presenting a page window for a computer controlled process as claimed in claim 24, wherein retrieving a base image further comprises deriving a final base image from a plurality of base images prior to retrieval.

26. A computer system adapted to presenting a page window for a computer controlled process, comprising:
 a processor;
 a memory comprising software instructions adapted to enable the computer system to:
  retrieve a base image including at least one base image element responsive to either control or status stimuli;
  retrieve a secondary image including at least one secondary image element responsive to either control or status stimuli;
  merge the base image and secondary image, wherein the retrieved secondary image completely overlays the retrieved base image, thereby creating the page window, and during the merger, if a base image element has a corresponding secondary image element, the merger blanks out both the base image element and the corresponding secondary image element from the created page window; and
  displaying the page window.

27. The computer system adapted to presenting a page window for a computer controlled process as claimed in claim 26, wherein retrieving a base image further comprises deriving a final base image from a plurality of base images prior to retrieval.

28. A computer program product for enabling a computer to present a page window for a computer controlled process, comprising:
 software instructions for enabling the computer to perform predetermined operations, and a tangible computer readable medium encoded with the software instructions;
 wherein the predetermined operations comprise:
  retrieving a base image comprising at least one base image element responsive to either control or status stimuli;

retrieving a secondary image comprising at least one secondary image element responsive to either control or status stimuli;

merging the base image and secondary image, wherein the retrieved secondary image completely overlays the retrieved base image, thereby creating the page window, and during the merger, if a base image element has a corresponding secondary image element, the merger blanks out both the base image element and the corresponding secondary image element from the created page window; and displaying the page window.

* * * * *